US012562082B2

(12) United States Patent
Marks

(10) Patent No.: US 12,562,082 B2
(45) Date of Patent: Feb. 24, 2026

(54) HIGH VISIBILITY AERIAL LANDING SYSTEM

(71) Applicant: Team Easties LLC, Pelham, NH (US)

(72) Inventor: Jason Marks, Pelham, NH (US)

( * ) Notice: Subject to any disclaimer, the term of this patent is extended or adjusted under 35 U.S.C. 154(b) by 162 days.

(21) Appl. No.: 18/424,777

(22) Filed: Jan. 27, 2024

(65) Prior Publication Data

US 2024/0257673 A1 Aug. 1, 2024

Related U.S. Application Data

(63) Continuation of application No. 29/883,484, filed on Jan. 30, 2023, now abandoned, and a continuation of application No. 29/883,500, filed on Jan. 30, 2023, now Pat. No. Des. 1,089,867.

(60) Provisional application No. 63/442,016, filed on Jan. 30, 2023.

(51) Int. Cl.
*G09F 13/20* (2006.01)
*G09F 17/00* (2006.01)
*G09F 19/22* (2006.01)

(52) U.S. Cl.
CPC ...... *G09F 13/20* (2013.01); *G09F 2017/0083* (2013.01); *G09F 19/228* (2013.01)

(58) Field of Classification Search
CPC . G09F 13/20; G09F 19/228; G09F 2017/0083
See application file for complete search history.

(56) References Cited

U.S. PATENT DOCUMENTS 4,250,646 A * 2/1981 Trachtenberg .......... G09F 13/16 40/561
4,499,133 A * 2/1985 Prince ....................... A45F 4/00 428/192
4,987,848 A 1/1991 Todd
5,110,219 A * 5/1992 Lopes ...................... A45C 9/00 5/419
5,141,200 A * 8/1992 Sherman ................. E04H 15/62 248/500
6,976,786 B1 * 12/2005 Stanley, Jr. ............. G09F 17/00 383/117
7,302,908 B1 * 12/2007 Bieberdorf .............. E01F 9/594 116/63 P
8,007,120 B2 8/2011 Foley
9,858,837 B1 * 1/2018 Cameron ................ G09F 17/00
10,036,550 B1 * 7/2018 Reid .................... G08G 1/0955
10,460,635 B1 * 10/2019 Cameron ................ G09F 17/00
10,529,257 B1 * 1/2020 Peelgrane ................. G09F 3/02
2009/0095210 A1 * 4/2009 Walls ...................... G09F 17/00 116/173
2009/0120350 A1 * 5/2009 Tamez, Jr. ............... A62B 3/00 116/205
2010/0177517 A1 * 7/2010 Foley ....................... B60Q 7/02 359/549

(Continued)

*Primary Examiner* — Gary C Hoge

(74) *Attorney, Agent, or Firm* — Patent Negotiator, PLLC; Sarita L. Pickett

(57) ABSTRACT

A high visibility aerial landing system for providing improved visibility and landing indication at short range or close range for a helicopter to help distinguish between safe or preferred landing zones from hazardous landing zones. The system has a flexible panel, a mooring assembly, and an indicator system. Further embodiments are specialized to be carried by the EMS or hikers.

11 Claims, 10 Drawing Sheets

(56) References Cited

U.S. PATENT DOCUMENTS

| | | | | |
|---|---|---|---|---|
| 2012/0284917 | A1* | 11/2012 | Nirmel | A47G 9/0238<br>40/584 |
| 2014/0212067 | A1* | 7/2014 | Hicks | A45C 9/00<br>383/4 |
| 2018/0078841 | A1* | 3/2018 | Wilkins | A63B 69/0028 |
| 2020/0039719 | A1* | 2/2020 | Wang | B65D 81/2015 |
| 2021/0016897 | A1* | 1/2021 | Kristofersson | E01F 9/506 |

* cited by examiner

HIGH VISIBILITY AERIAL LANDING SYSTEM

CROSS-REFERENCE TO RELATED APPLICATIONS

The instant application is a continuation of U.S. Design patent application No. 29/883,484 filed on Jan. 30, 2023, and of U.S. Design patent application No. 29/883,500 filed on Jan. 30, 2023, and Provisional Utility Application No. 63/442,016 filed on Jan. 30, 2023, which are hereby incorporated by reference in their entirety.

BACKGROUND OF THE INVENTION

1. Field of the Invention

The present invention relates generally to aerial landing systems, particularly, landing flags.

2. Description of the Prior Art

Aerial landing systems are used in a variety of situations. Many different types of flags have generally been used for identification purposes, safety purposes, and signaling. Landing cones are used to identify areas from the sky.

U.S. Pat. No. 4,987,848 discloses a "dual purpose visual identification and safety flag comprising at least one sheet portion carrying a nonemergency visible identification display and substantially coextensive with the sheet portion, a flexible radar reflecting portion of silver anodized rip-stop nylon."

U.S. Pat. No. 8,007,120 discloses a safety flag which includes reflective material.

SUMMARY OF THE INVENTION

Advantages and Differences of Invention Over Known Prior Art

In an emergency or any type of scenario where the use of arial platforms is required, a "long range target" and a "close range target" are required for the pilot to land exactly where they are needed rather than where they might think is the best location on the ground. A street intersection or a GPS grid are given for the long-range target which provides the pilot the direction of travel and an estimated area for which they are needed to land, however without the use of a short-range target, the pilot may not land in the best/most practical location for whoever is needing them on the ground. The present invention overcomes the obstacles of the prior art by giving the pilot a definitive location of where the helicopter is needed.

A real-life example of a time this could have been used was given by a local industry professional. In a situation where there was a roadside emergency and a helicopter was needed, the ground professionals radioed a GPS coordinate of their location, the team on the ground had deemed a parking lot nearest them safe to land. Unfortunately, the location of this parking lot was not able to be conveyed.

When the pilot arrived, he landed the helicopter on a soccer field next to the parking lot. From the air, the pilot couldn't see that the fence surrounding the soccer field was locked. This barricade was an impediment to expedient air travel as it caused the medical team on the ground an extra obstacle to overcome. The medical team eventually had to run back to the fire dept truck, retrieve lock cutters, open the fence, and then go back and transport the individual on the stretcher through the fence, to the helicopter. All of this traversal cost valuable time that could have been the difference between life and death.

What is needed is a system that has high visibility from the air, visible during both day and night, and capable of withstanding the high speeds created by the rotor wash.

After years in the army, using a daytime only arial marker for helicopter landing zones which required external fixators, the inventor was driven to make the present invention, a high visibility aerial landing marker panel system, with alternative features for various situations. Each embodiment of the present invention is a more functional version with the addition of nighttime capabilities, and capable of working with both external fixators and the provided mooring assembly.

One embodiment of the present invention is a drastically lighter, more functional, and packable arial landing visibility system with added night viewing capabilities, capable of fast transport for emergency personnel. That is, currently, there are emergency landing cones, that are heavy to carry, difficult to place, and hard to transport in sufficient quantity to provide sufficient viewing capabilities to a helicopter pilot at higher altitudes.

The inventor's time spent backpacking through the backcountry also made them cognizant of the importance of a short-range marker for aircraft in the event of an emergency. The satellite communication device with SOS capabilities that are available for backpackers to carry only gives search and rescue teams a long-range target. Satellite communication devices with SOS capabilities do not provide close-range targeting information.

The present embodiment of this marker panel system provides emergency personnel with a highly visible, precise location to focus their attention. This eliminates unproductive time spent conducting flyovers of the approximate coordinates. This also makes it more efficient for the pilot to determine the safest and most accessible landing location. The present invention has multiple embodiments. One embodiment of the present invention is lightweight, specifically customized to be carried by hikers in a backpack. One embodiment of the present invention is weighted, specifically customized to be to be carried by EMS in the field for faster deployment.

The present invention overcomes the obstacles of the prior art by providing a high visibility aerial landing system capable of employing environmental ballast. The high visibility aerial landing system has a marker panel backing having a front, a back, top, bottom, edges extending along a perimeter, with corners between adjacent edges.

The high visibility aerial landing system has a plurality of ballast assemblies secured along edges of the marker panel. An anchor assembly is secured along corners of the marker panel. The high visibility aerial landing system has an indicator system facilitating night vision.

The high visibility aerial landing system has a first of the plurality of ballast assemblies which is a dual-capability ballast assembly. This dual-capability ballast assembly has: a compartment enclosing a hollow, a seal secures the compartment fixedly to the panel. A reversible inlet is along one lip of the compartment. A locking mechanism is provided along the reversible inlet capable of reversibly securing the hollow.

The high visibility aerial landing system has a first configuration facilitating use—for indicating alert to a helicopter or other aerial mobile vehicle. The hollow within the container is capable of containing the environmental ballast when the high visibility aerial landing system is in this first configuration.

The high visibility aerial landing system has a second configuration facilitating travel either in an ambulance or while hiking on foot. The hollow is capable of containing the panel when the high visibility aerial landing system is in this second configuration.

The high visibility aerial landing system sometimes has an indicator system which includes the base of the panel, and at least one shape affixed to the base. The base and the shape have coordinated complementary colors, such that if a color of the base has a first value H0, then a color of the at least one shape has a value according to the formula: Hx=[H0−(360−x degrees)]+360 degrees.

Another embodiment of the high visibility aerial landing system according to the present invention has a marker panel backing having a top and bottom. A mooring assembly is secured to the panel, and the mooring assembly has a plurality of ballast assemblies. An indicator system facilitates scotopia (vision in dark light). Again, at least one of the plurality of ballast assemblies is a dual-capability ballast assembly.

The indicator system comprises a base of the panel, and at least one shape affixed to the base. wherein the base and the at least one shape having coordinated complementary colors, such that a color of the base has a first value H0, then a color of the at least one shape has a value according to the formula: Hx=[H0−(360−x degrees)]+360 degrees.

The base and the at least one shape each consist of fluorescent reflective material of contrasting colors capable of returning more than 100% of an amount of energy falling on the fluorescent materials at some wavelengths. The indicator system sometimes has a high visibility aerial pattern having a shape with an internal shape, an external shape, and an intermediate shape, each nested one within the other. Each of the plurality of ballast assemblies of the mooring assembly secured to the panel further has an irreversibly secured component for holding and further securing at least one reversibly attachable weighted component.

Each of the plurality of ballast assemblies of the mooring assembly secured to the panel further has a compartment enclosing a hollow. The hollow is capable of containing a ballast. Each of the plurality of ballast assemblies further has a seal securing the compartment fixedly to the panel.

The mooring assembly secured to the panel further has an anchor assembly which in turn has a first irreversibly secured component being irreversibly secured to the panel and holding and further securing an reversibly attachable component.

In one embodiment, the first irreversibly secured component is a D-ring, and the reversibly attachable component is a reversible locking clamp.

In one embodiment, the first irreversibly secured component is a nylon lanyard loop, and the reversibly attachable component is a grounding spike having a hook which interlocks with the nylon lanyard loop.

Another embodiment of the high visibility aerial landing system according to the present invention is designed for use within an environment having environmental ballast. This embodiment of the high visibility aerial landing system has a marker panel backing having a top and a bottom. A mooring assembly is secured to the panel, and the mooring assembly has a plurality of ballast assemblies. An indicator system facilitates night vision. At least one of the plurality of ballast assemblies is a dual-capability ballast assembly which has: a compartment enclosing a hollow, and a seal securing the compartment fixedly to the panel. A reversible inlet is along one lip of the compartment. A locking mechanism is along the reversible inlet capable of reversibly securing the hollow. The hollow is capable of reversibly and securely containing the environmental ballast. Sometimes the environmental ballast is entirely secured within the hollow, other times, the environmental ballast is only partially within the hollow. Regardless, the locking mechanism is capable of closing and securing the compartment sufficiently to secure the environmental ballast within the hollow.

The high visibility aerial landing system often has an indicator system which has a base of the panel, and at least one shape affixed to the base. The base and the at least one shape have coordinated complementary colors, such that a color of the base has a first value H0, then a color of the at least one shape has a value according to the formula: Hx=[H0−(360−x degrees)]+360 degrees. The base and the at least one shape each consist of fluorescent reflective material of contrasting colors made of highly visible reflective nylon. The pattern has an internal shape, an external shape, and an intermediate shape, each nested one within the other.

The indicator system further comprises: a base of the panel being a reflective nylon. A first strip of reflective webbing, having a first coloring, is attached to the front of the reflective nylon. A second strip of reflective webbing having a coloring the same as the first strip, is attached to the front of the reflective nylon. A third strip of reflective webbing having a coloring that is different from the first strip and the second strip, is attached to the front of the reflective nylon panel backing between the first strip and the second strip. At least four reflective lanyard loops are each attached to each of the four corners of the panel.

DETAILED DESCRIPTION OF THE INVENTION

FIGS. 1-14—High Visibility Aerial Landing Systems

Figure 1:
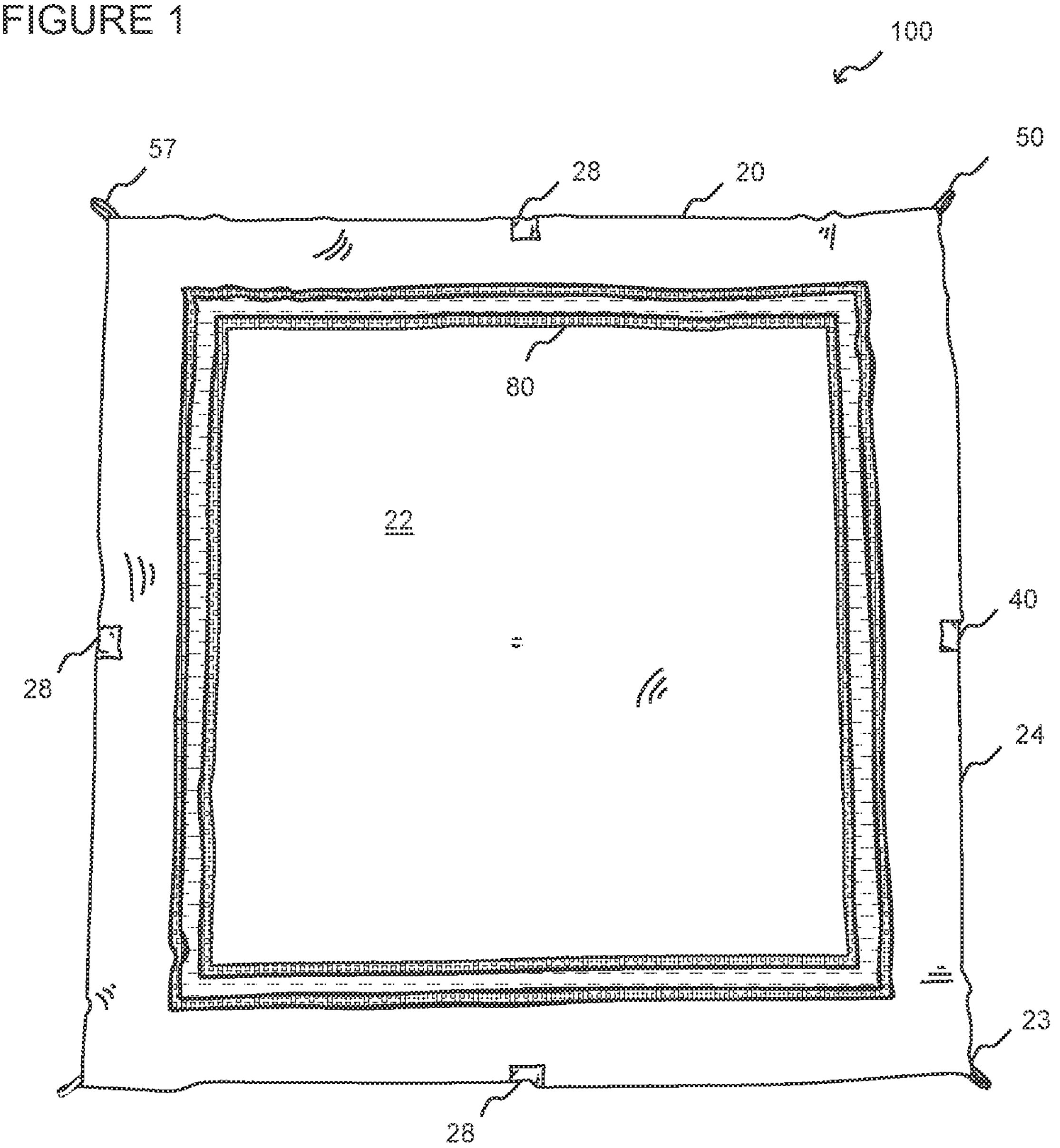
FIG. 1 is a top planar view of the marker panel in a first configuration, the panel having a mooring assembly and indicator system.

Shown in FIGS. 1-11 are various embodiments and aspects of the high visibility aerial landing system 100, a system 20 for providing improved visibility and landing indication at short range or close range for a helicopter 4 in a landing zone 8. The system 100 has a panel 20, a mooring assembly 30, and an indicator system 80.

Figure 2:
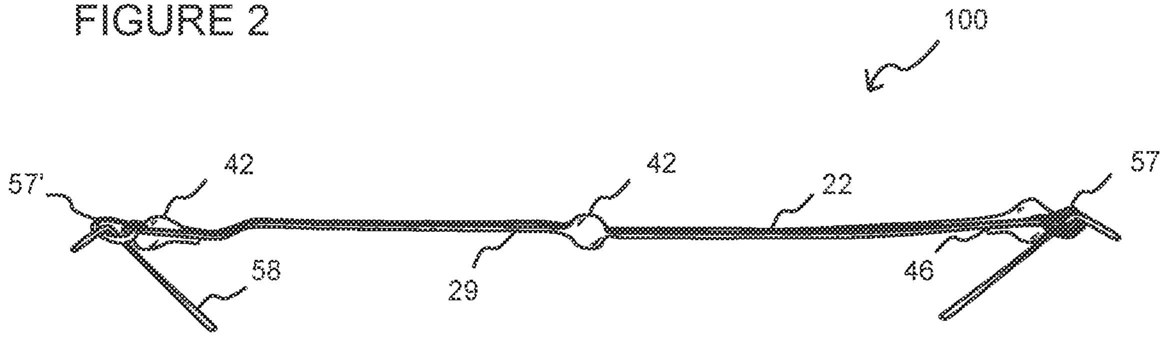
FIG. 2 is a planar side view of the invention in the first configuration as shown in FIG. 1.
Figure 3:
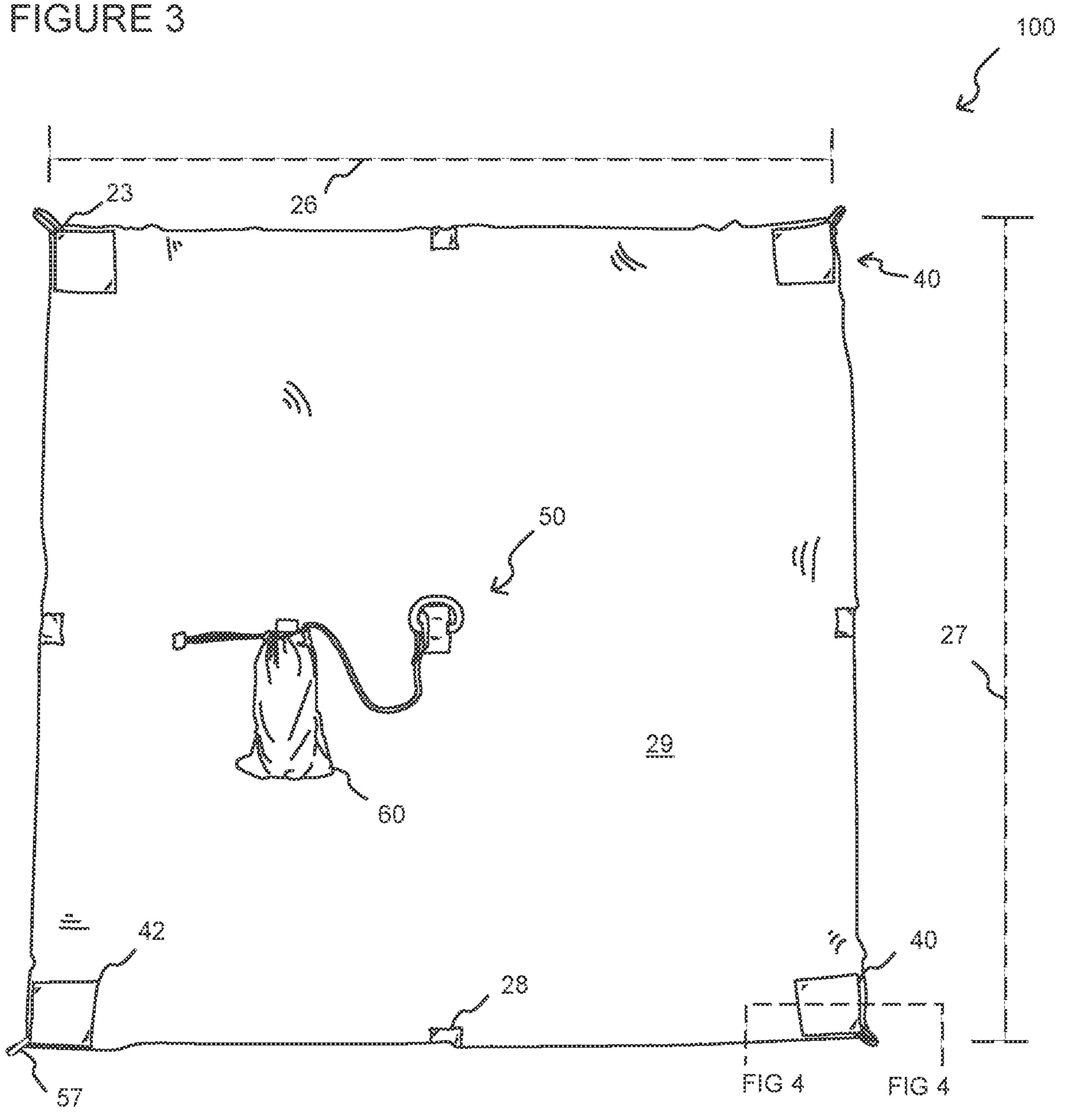
FIG. 3 is a planar bottom view of the invention in the first configuration as shown in FIG. 1.
Figure 4:
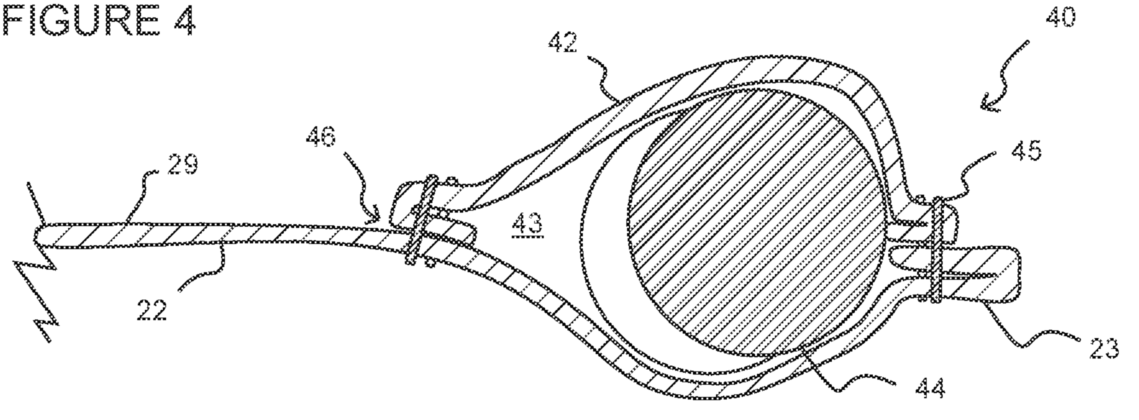
FIG. 4 is a cross-sectional enlarged view of the ballast assembly of the invention in the first configuration as shown in FIG. 3.
Figure 5:
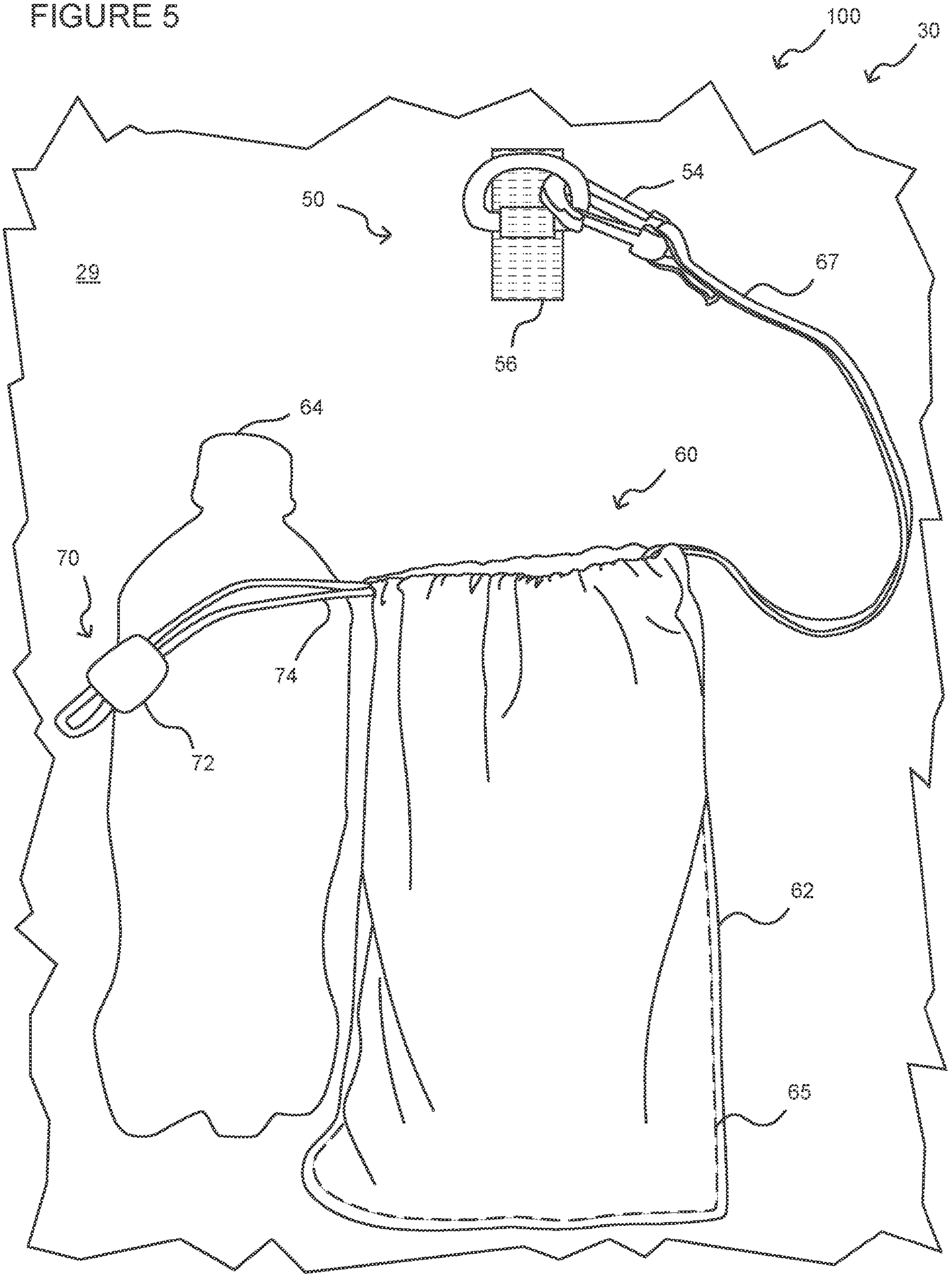
FIG. 5 is an enlarged view of the ballast assembly of the embodiment of the invention in FIG. 3 in an attached configuration.
Figure 6:
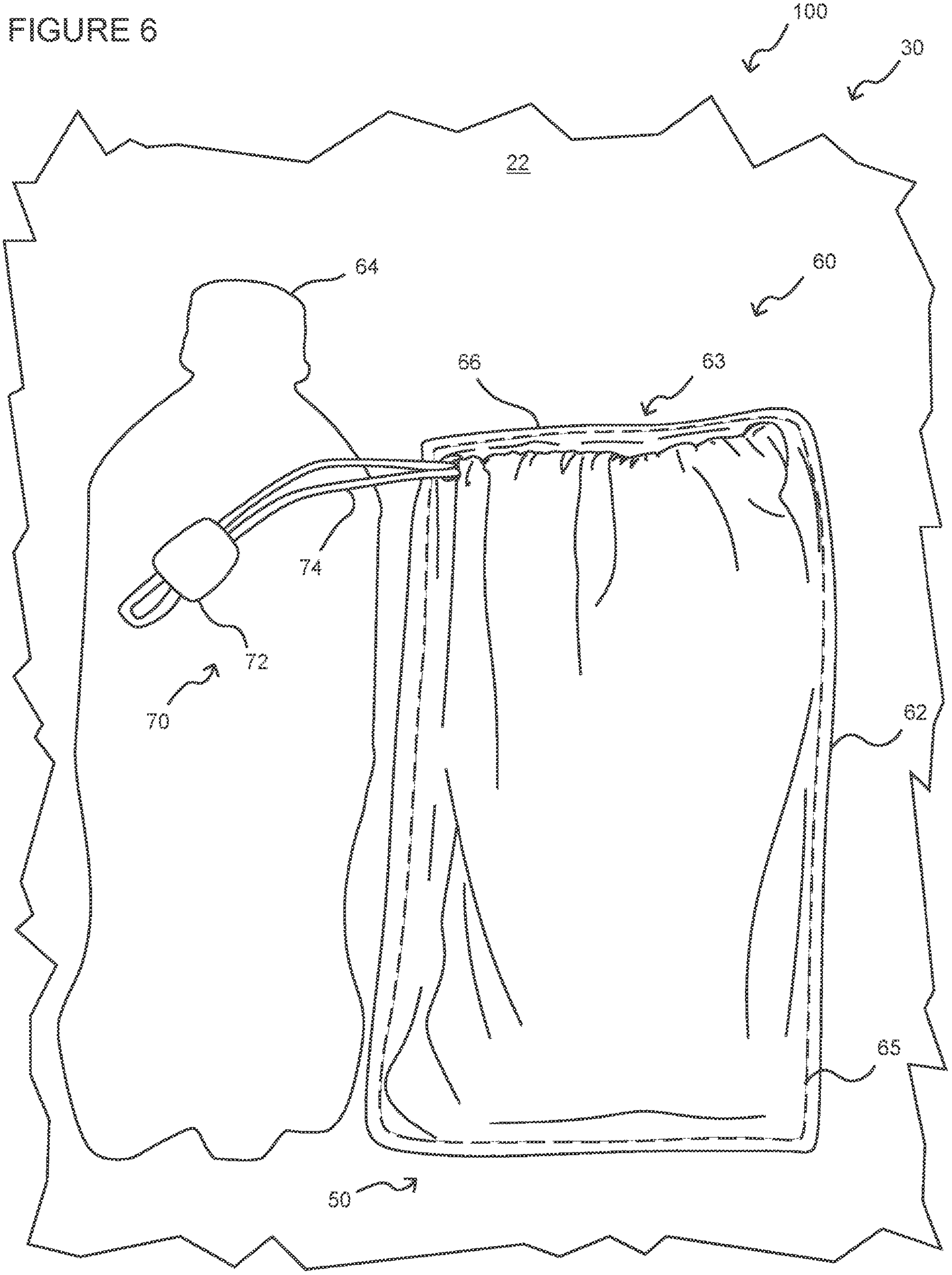
FIG. 6 is an enlarged view of the ballast assembly of a further embodiment of the invention in an attached configuration.
Figure 7:
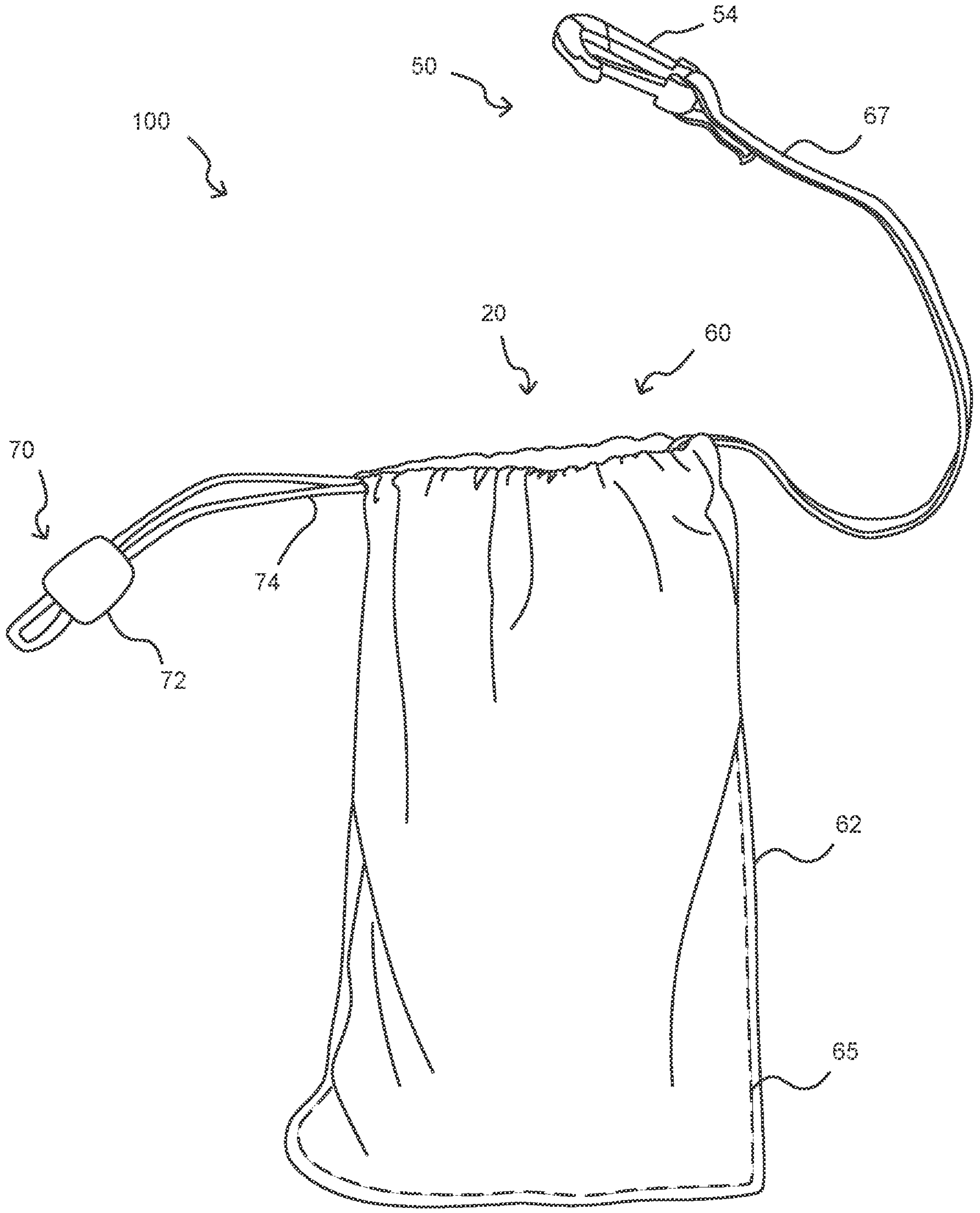
FIG. 7 is an enlarged view of the panel of a further embodiment of the invention in a second folded configuration within the ballast container.

FIGS. 1-3—Marker Panel 20

The marker panel 20 has a generally rectangular shape made of a flexible material with a perimeter 21 edge, top 22, corners 23, sides 24, length 26, width 27, midpoints 28, and bottom 29. The length 26 of the marker panel 20 is preferably between 12 and 72 inches, more preferably between 24 and 60 inches, and most preferably between 36 and 48 inches. The width 27 of the marker panel 20 is preferably between 12 and 72 inches, more preferably between 24 and 60 inches, and most preferably between 36 and 48 inches.

Preferably, the fabrics employed for this panel marker 20 need to be a tear resistant, highly visible, highly protective, tough, waterproof fabric. Preferably, made of various ranges of coated woven synthetic thermoplastic polymers and/or polyester—plain, dobby, basket or rip-stop. One example of this woven fabric includes Cordura™ nylon constructions, such as HI-VIS t485 fabric. While the coloring and patterns of the fabrics are discussed in further detail below with respect to figures that is a reflective neon orange or green.

FIGS. 4-7—Mooring Assembly 30

The mooring assembly 30 of the system 100 includes a small ballast assembly 40, an anchor assembly 50, and a large ballast assembly 60. While these assemblies are discussed separately for clarity, it is to be understood that in some embodiments, the ballast assembly 40 may include components which overlap with an anchor assembly 50 or the ballast assembly 60, or vice versa. Regardless of which embodiment is described though, the mooring assembly 30 has at least one irreversibly secured component 42, 52, 56, 65, 57, for holding and further securing at least one reversibly attachable weighted component 44, 64, 58 to the panel 20.

For each ballast assembly 40, a compartment 42 encloses a hollow 43 which contains ballast 44. A seal 45 secures the compartment fixedly to the panel 20, while a reversable inlet 46 allows additional ballast 44 to be provided to the panel 20. This enables the system 100 to have multiple weight configurations, a first for carrying, and at least a second for use. Each ballast 44 has a weight that is preferably between 0.1 and 4 ounces, more preferably between 0.25 and 1 ounce, and most preferably between 0.5 ounces. The total weight of the ballast of the system 100 (when provided) being between 400 and 1 ounces, 200 and 2 ounces, and preferably between 72 and 4 ounces.

Anchor assembly 50 shown here has a connector 52, such as a D-ring, for attaching a releasable large ballast assembly 60. A strip of 0.75" black nylon webbing may form a band 56 which securely fastens the connector 52 to the marker system 100 of the panel 20. A faster 54 such as a clip or other reversible locking clamp, with a tether 67 connected to a releasable ballast assembly 40, 60 can then be reversibly and releasably connected to the irreversibly secured connector 52. In other embodiments, such as the embodiment shown in FIG. 13, the irreversibly secured connector 52 of the anchor assembly 50 is part of the ballast assembly 60, as well, and also acts to irreversibly secure the ballast assembly 60 to the marker panel 20 of the system 100.

One of irreversibly secured components of the anchor assembly 50 are reflective nylon lanyard loops 57 attached to each corner 23 of the marker panel 20. These may be sewn into each corner or otherwise securely, nonreleaseably attached for staking the system 100 into the ground 8 with removable spikes 58 either provided as part of the panel system 20, or separately. For embodiments that do not include these spikes 58 to reduce carrying weight, the size of the loops 57 are designed to complement tent stakes 58 which are likely already on hand (sticks, tree branches or rocks could accomplish the same task if tent stakes are not on hand). Note that during use, if the system is to be employed on pavement, the stakes 58 remain within the large ballast assembly compartment 62 and act as additional ballast 64.

For each large ballast assembly 60, a compartment 62 encloses a hollow 63 which is capable of releasably containing ballast 64. A seal 65 around a majority perimeter of the compartment closes these sides of the compartment 62. A reversable inlet 66 allows additional ballast 64 to be provided to the compartment 62, for further securing the panel 20. Again, this enables the system 100 to have multiple weight configurations, a first for carrying, and at least a second for use.

Figure 12:
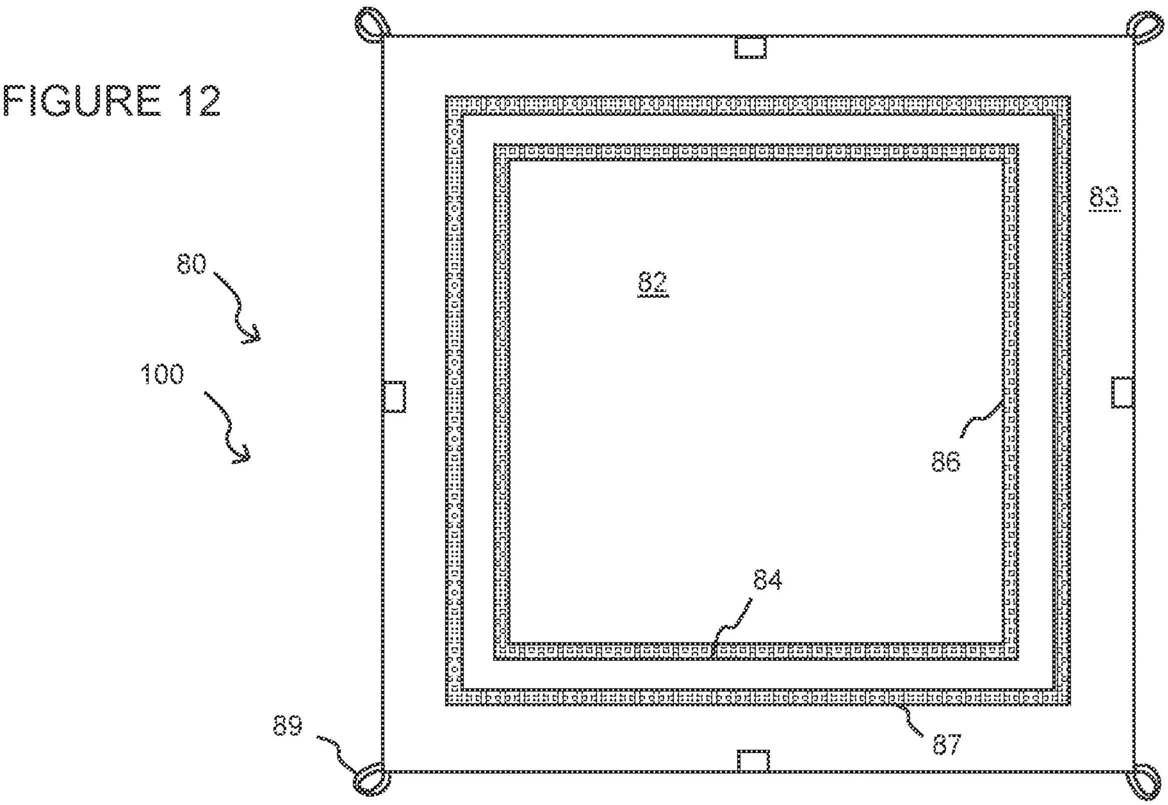
FIG. 12 is a planar top view of a second embodiment of the invention in the flattened third configuration to better illustrate the indicator system.
Figure 13:
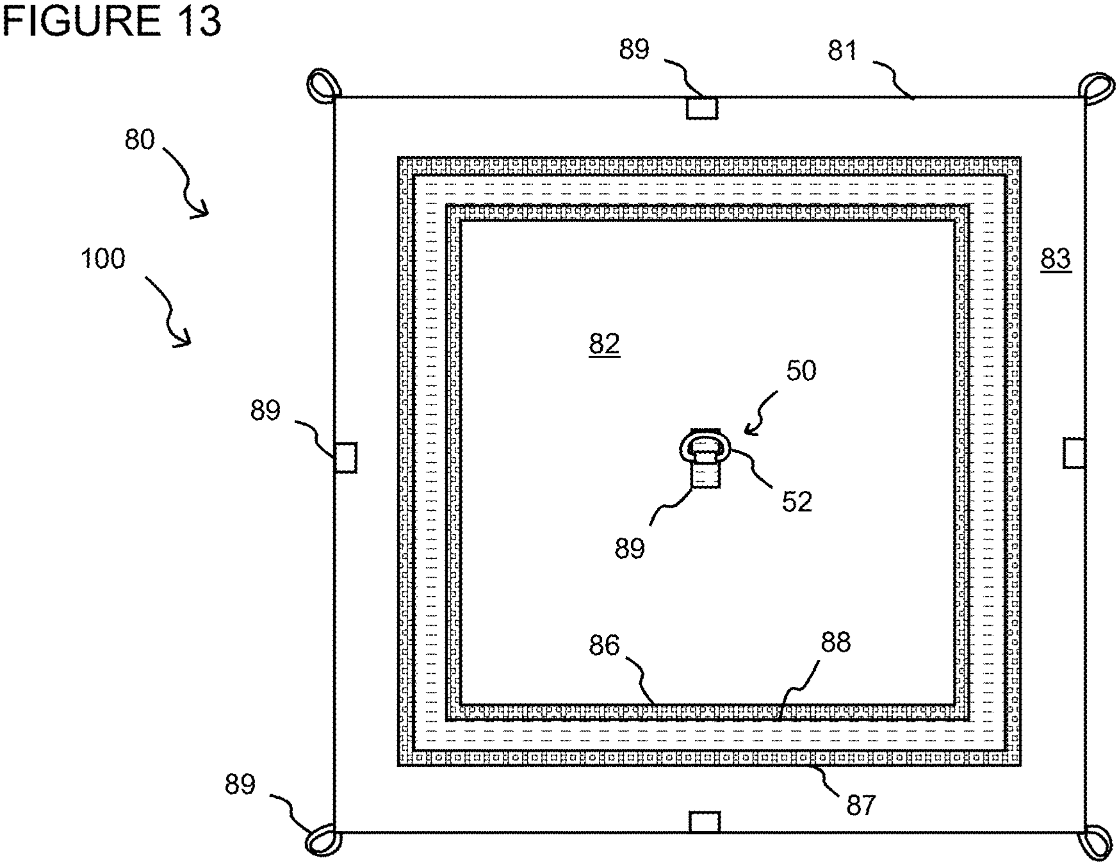
FIG. 13 is a planar top view of a further embodiment of the invention in the flattened third configuration to better illustrate the indicator system.

Ballast assemblies 40, 60 with a reversible inlet 66 are provided with a reversible lock 70 with at least a first interlocking member 72 and a second interlocking member 74 capable of reversibly sealing the inlet 66, 46. As shown in FIG. 12, this lock 70 may be a paracord sewn into an enclosure along the lip of the inlet 66, 46, with a single cord lock 72. Alternatively, these locks 70 may be another form of reversible lock such as a zip fastener, clasp locker, or other device for reversibly binding the disparate edges of the inlets 46, 66.

It is to be understood that, for clarity, the small ballast assembly 40 is discussed separately from the larger ballast assembly 60. However, for both the larger assembly 60 and the smaller ballast assemblies 40, the major components are the same. The biggest distinction between the small ballast assembly 40 and the large ballast assembly 60 is the dual configuration capability of the large ballast assembly 60. Both ballast assemblies have compartments made of the same heavy-duty, durable material capable of withstanding heavy forces, and/or tearing forces.

Figure 14:
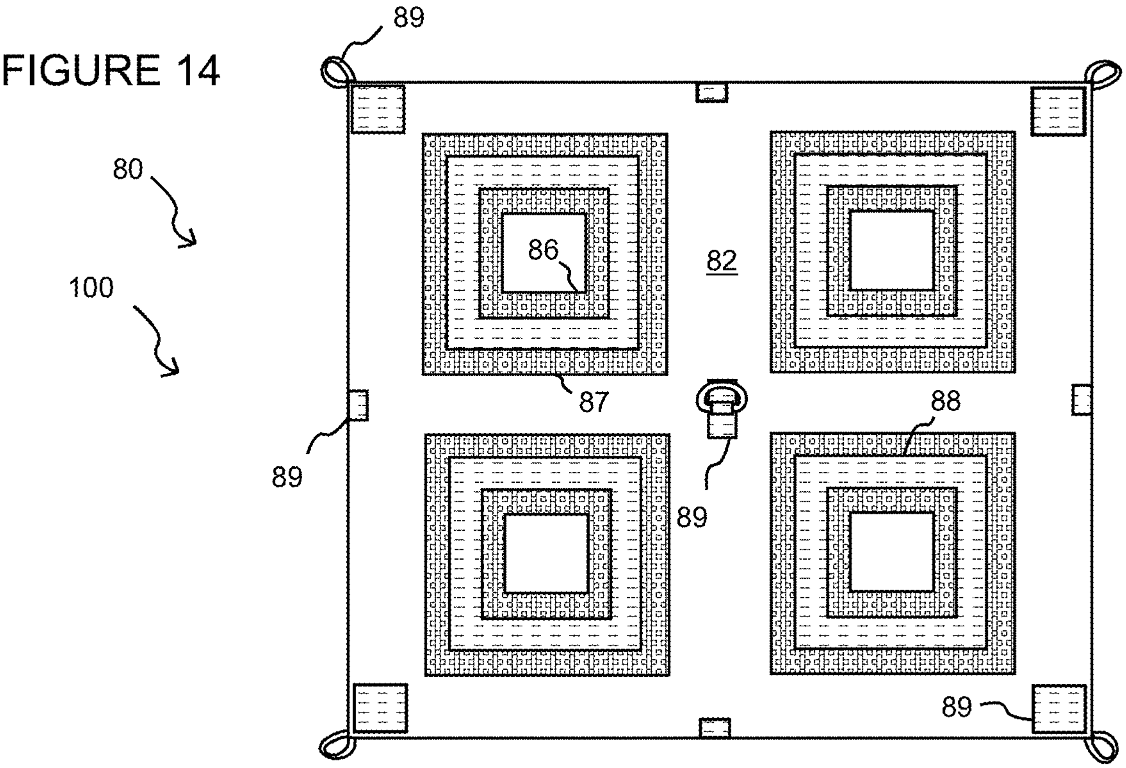
FIG. 14 is a planar bottom view of a further embodiment of the invention in the flattened third configuration to better illustrate the indicator system.

That is, the large ballast assembly 60 has dual capabilities, to serve as a ballast assembly during use, and to serve as a carry case while traveling. FIG. 14 is a top view of the system 100 in this third configuration. In this configuration of the system 100, the panel 20 is fully folded and fully enclosed within the ballast container 60. While carrying cases are generally known, too often these prior art cases become impediments to functionality during use, taking up space, or even getting in the way when it is time for deployment. Then, during use, the carrying sacks are often lost, and thus, no longer functional. The dual functionality of the large ballast assembly ensures that these problems with the prior art are overcome.

Pre-Weighted EMS Embodiment

This embodiment of the present invention is designed specifically to be employed for EMS situations, when every millisecond of time matters for efficiency and efficacy—as every second can be the difference between life or death in emergency transport situations. While identical in all aspects to those discussed above, a few details are further discussed now. This embodiment of the system 100 has a marker panel 20 that is 48"×48" orange, 70 denier ripstop nylon with 2.25" fluorescent green reflective webbing sewn 4" in from edges 24.

Ballast 44 in the form of 0.5-ounce weights are prepacked in each compartment 42, 62 in each corner 23 as well as at each midpoint 28. In one weighted embodiment, centered on the underside 29, is a 0.75"×2" strip of black nylon webbing 56 with a d-ring 52 sewn into the middle of the webbing 56. The stuff sack 60 is made of the same 70 denier ripstop and is connected via a reflective, black lanyard 67. In another weighted embodiment, centered on the underside 29, the stuff sack 60 is secured directly to the panel 20, and additional ballast 64 is within the hollow 63, this additional ballast 64 remains inside the compartment 62, while the remainder of the panel is retrieved from the hollow 63.

Figure 15:
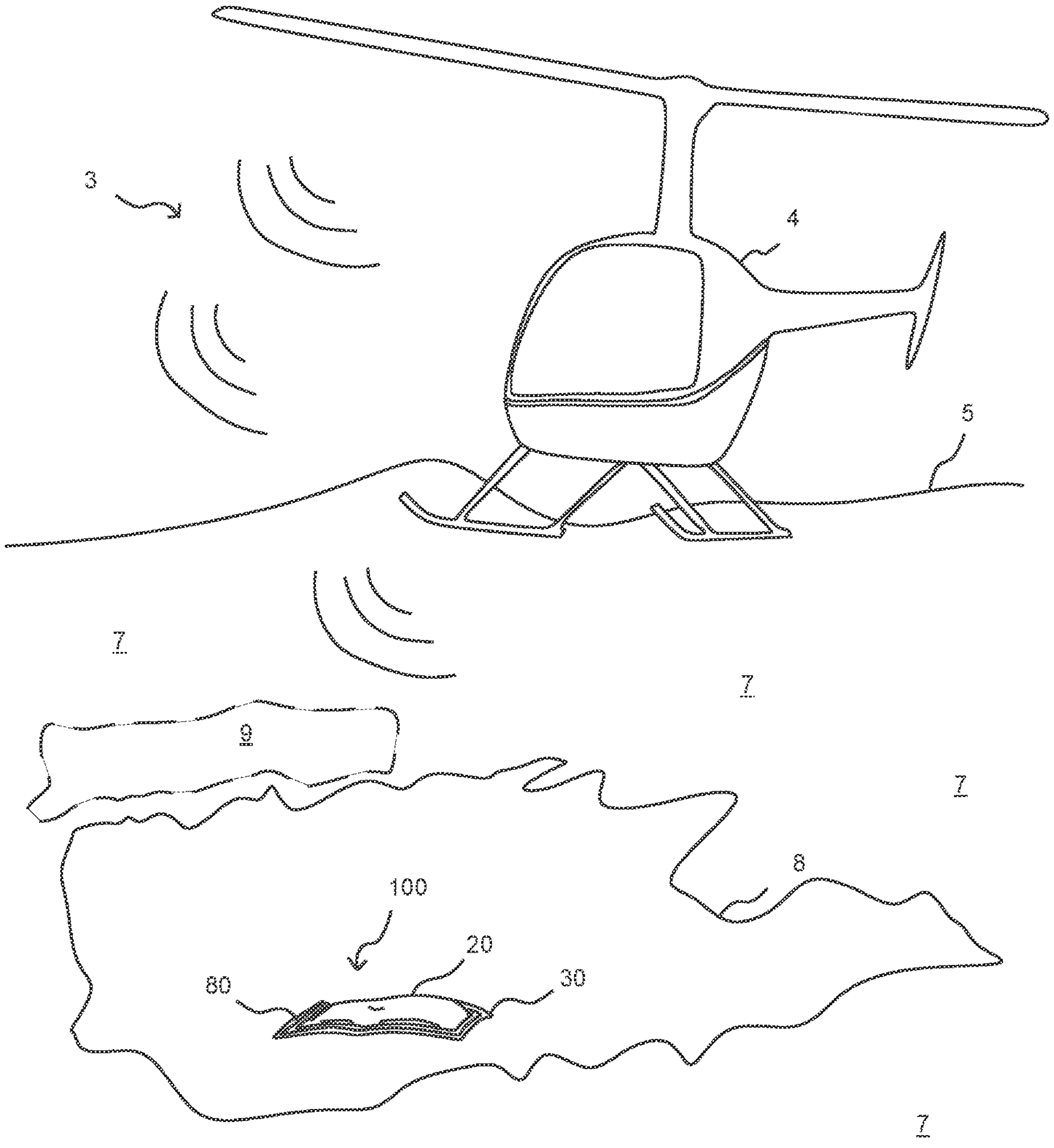
FIG. 15 is a perspective view of the embodiment of the invention shown in FIG. 1 as shown in use.

The larger ballast assembly 60 is secured to the bottom of the panel 20. This keeps the system 100 from being blown off of the ground and/or sucked back into the rotors of a helicopter 4. The larger ballast assembly 60 is preferably sized and constructed to be capable of holding an average sized insulated thermos, water bottle, 2 liter fluid container, or other environmental ballast which is meant to add the necessary weight to keep it all on the ground. The weights sewn into the panel itself are placed in such a way to cause the rotor wash (winds) to collapse the panel onto itself. Regardless, when being deployed in the use configuration, as shown in FIG. 15, the whole system 100 takes less than 5 seconds to unpack and lay out, ideal for EMS personnel trying to minimize the time of emergency travel in extenuating circumstances.

Lightweight Backpack Embodiment

This embodiment of the present invention is designed specifically to be employed for hiking circumstances, when every milligram of weight matters for efficiency and efficacy—as hikers are more likely to abandon heavier items along the trail despite how imperative they may be to survival. While identical in all aspects to those discussed above, a few details are further discussed now. This embodiment of the system 100 has a base that is 36"×36" orange, 30 denier ripstop nylon uncoated fabric with ⅞" green reflective webbing sewn approximately 0.5 inches from the sides 24.

Underneath, in each corner 23 are black reflective lanyard loops 57 sewn between the reflective webbing 85 and the nylon panel base 81. The ballast and anchor assemblies are all provided, however the compartments remain empty, and are designed to be filled with rocks or other external ballast. The loops 57 engage spikes 58, which are used for staking the marker 20 onto the ground 8.

While not in use, the marker 20 rolls up and fits into the ballast compartment 62, a stuff sack made of the same fabric, with a paracord drawstring 74 and a single cord lock 72. When rolled up and stowed in the second configuration, as shown in FIG. 14, the whole system 100 weighs less than 2.5 ounces, ideal for backpackers trying to minimize the weight carried providing additional security with minimal impact to the overall load.

FIGS. 8-14—Indicator System 80

In order to facilitate increased high visibility in both daylight and nighttime vision, the present invention employs an indicator system comprising an alert pattern indicator system 80 on the system 100 having coordinated complementary color combinations. Complementary colors are pairs of colors which, when combined or mixed, cancel each other out (lose hue) by producing a grayscale color like white or black. However, when placed next to each other, complementary colors create the strongest contrast and are more easily visible from greater distances. Complementary colors are also called "opposite colors".

Traditionally, a complementary color pair of any primary color (yellow, blue, or red) can be made by combining the two other primary colors (purple, orange, and green, respectively). Note that currently, in recent painting manuals, the more precise subtractive primary colors are referred to as magenta, cyan and yellow. Regardless, for a first complementary color pair, if the primary color is yellow, achieving the opposite color is done by combining red and blue. The result is purple, which appears directly across from yellow on the color wheel.

A wheel structure is an especially easy reference diagram structure for determining the opposite color; as the first complimentary color of a complimentary color pair is always directly opposite the root color on the color axle. Diagrammatically, this means that determining a first complimentary color of a complimentary color pair may be found finding the opposite color (180 degrees) apart from the root color.

Mathematically, this means that calculating a first complimentary color of a complimentary color pair may be found by subtracting 180 degrees from the root color (then adding 360 degrees to maintain an absolute value). For example, the formula for a two-color complementary color scheme consisting of a root color (H0) and a first opposite color (H1) that is 180 degrees apart from H0 on the color wheel may be expressed by:

$$H1=(H0-180\text{ degrees})+360\text{ degrees}.\qquad\text{Formula}$$

For the present invention, it is preferable that the second color have a complimentary color value about 180 degrees apart from the first color (on a 360 degree color wheel) with a confidence variable (margin of error). Generally, this confidence variable should be +/−10 degrees; preferably no more than +/−5 degrees; and most preferably no more than +/−2 degrees.

In some embodiments of the present invention, a layering pattern may be used that employs a split-complementary color scheme. In this case, instead of looking for one color that is the exact opposite of the other, it is necessary to find multiple colors that are each complimentary to each other. Grammatically, using a color wheel, this can be determined by finding the three or four colors that are furthest away from each other on the color scale. Mathematically, this can also be calculated by adding (or subtracting) (360 degrees/number of colors) from the first color.

A triadic split-complementary color scheme is a three-color combination that consists of a base color (H0) and two colors (H1 and H2) that are 120 degrees and 240 degrees apart from H0 respectively.

$$H1 = (H0 - 120\text{ degrees}) + 360\text{ degrees.} \quad \text{Formula2}$$

$$H2 = (H0 - 240\text{ degrees}) + 360\text{ degrees.} \quad \text{Formula3}$$

A tetradic split-complementary color scheme is a four-color combination that consists of a base color (H0) and three colors (H1, H2, and H3) that are 90 degrees, 180 degrees, and 270 degrees apart from H0 respectively.

$$H1 = (H0 - 90\text{ degrees}) + 360\text{ degrees.} \quad \text{Formula4}$$

$$H2 = (H0 - 180\text{ degrees}) + 360\text{ degrees.} \quad \text{Formula5}$$

$$H3 = (H0 - 270\text{ degrees}) + 360\text{ degrees.} \quad \text{Formula6}$$

Mathematically, this means that each of these formulas can be broken down into one overarching formula:

$$Hx = [H0 - (360 - x\text{ degrees})] + 360\text{ degrees.} \quad \text{Formula7}$$

Note that these formulas only relate to the hue of the color, specifically, a hue is indicated by its position (in degrees) on the color wheel. Colors also have saturation, and lightness. Saturation is the intensity or dullness of a hue. A fully saturated hue has a value of 100%. Lightness refers to the visual perception of the luminance or 'glow' where white has a lightness value of 100%, neutral is 50%, and black has a lightness value of 0%.

The luminescence of the patterns will generally depend upon the degree of luminescent reflection. While non-fluorescent colored fabrics can reflect at any wavelength only a fraction of the amount of energy that falls on the material at that wavelength, fluorescent materials of the present invention are capable of returning more than 100% of the energy falling on them at some wavelengths. This produces the visual effect of a light source rather than a merely colored object and stands out from the surrounding environment as a beacon immediately.

Figure 8:
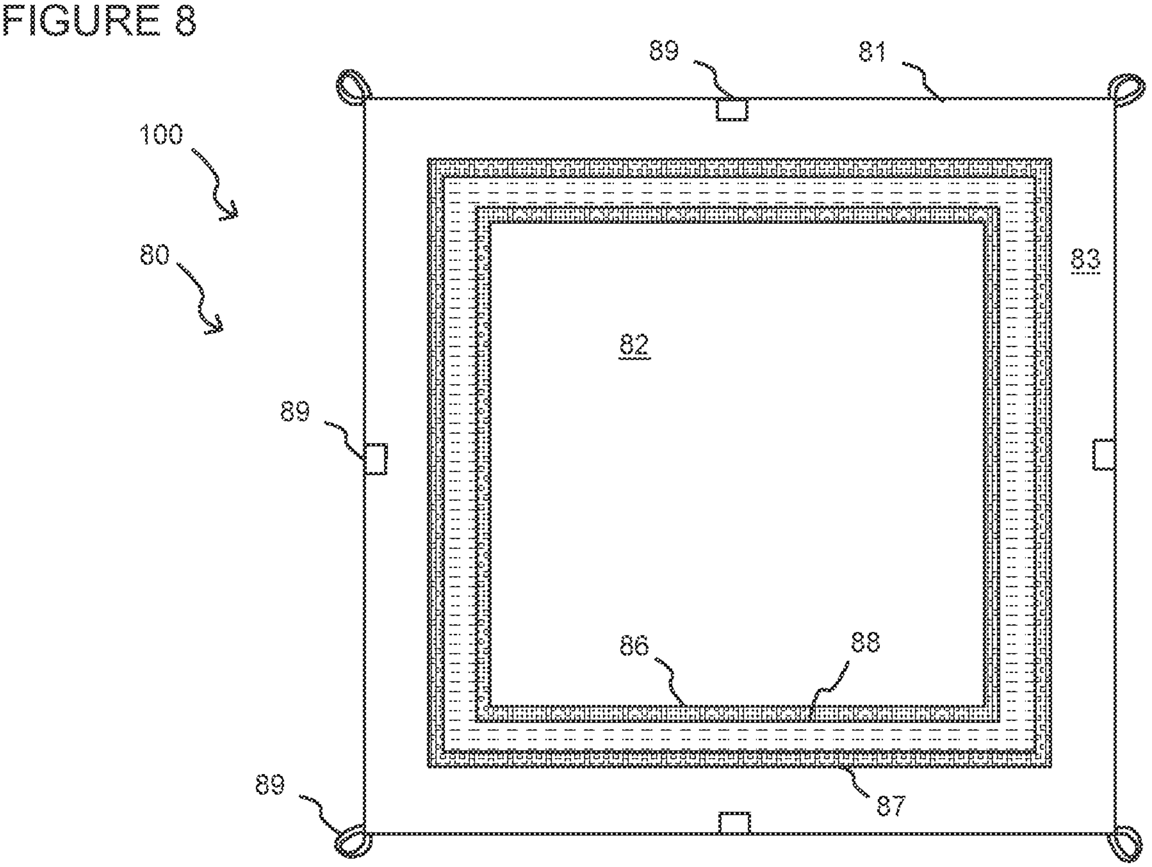
FIG. 8 is a planar top view of the invention shown in FIG. 1 in a flattened third configuration to better illustrate the indicator system.
Figure 9:
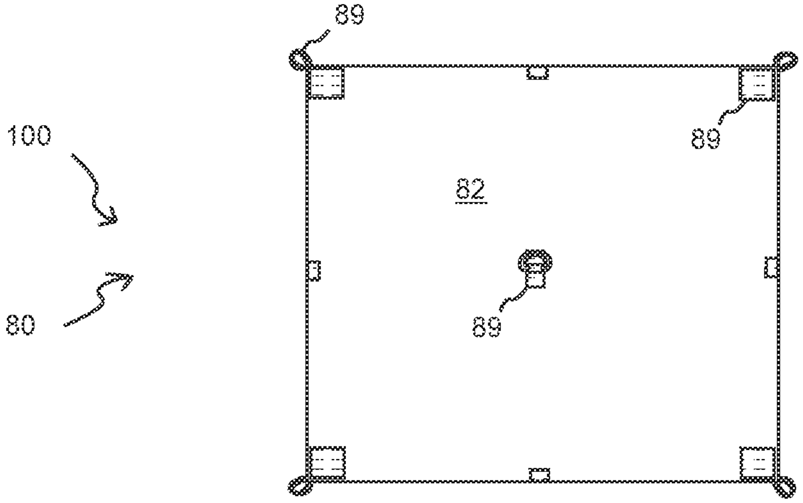
FIG. 9 is a planar bottom view of the invention in the flattened third to better illustrate the indicator system.
Figure 10:
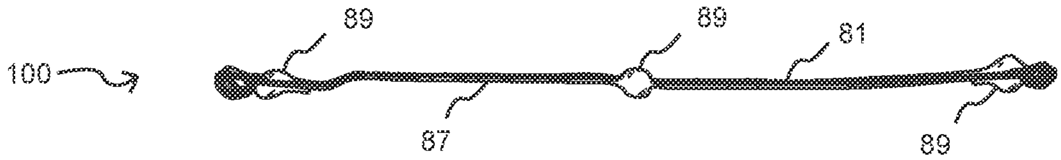
FIG. 10 is a planar side view of the invention in the flattened third to better illustrate the indicator system.
Figure 11:
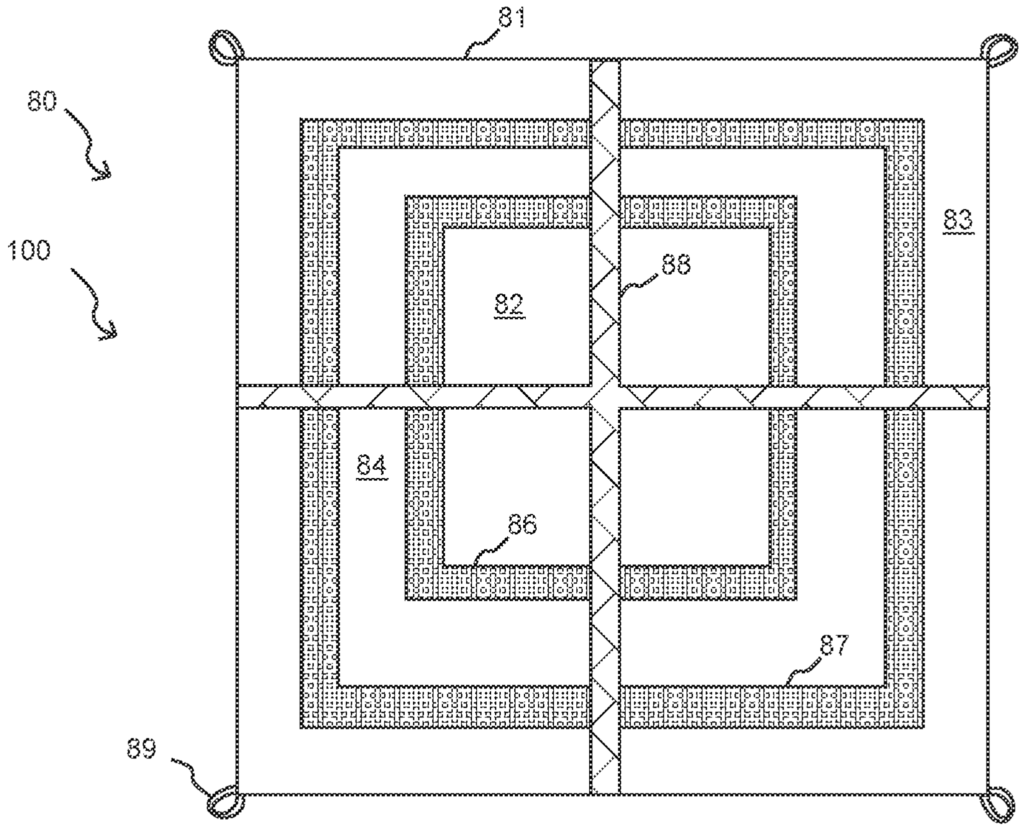
FIG. 11 is a planar top view of a second embodiment of the invention in the flattened third to better illustrate the indicator system.

FIGS. 8-10 illustrate one embodiment of the alert pattern 80 present on the top 22 (FIG. 8), the bottom 29 (FIG. 9), and the side 24 (FIG. 10) of the panel 20. In this embodiment, the base 81 has a first color and a solid pattern both along the base exterior 83 and the base interior 82. The external shape 87 has a color which compliments the base 81, creating a contrast along adjacent edges between the external shape 87 and the base exterior 83. The intermediate shape 88 has a color which compliments the external shape 87, creating a contrast along adjacent edges between the external shape 87 and the intermediate shape 88.

This embodiment has a silver fluorescent intermediate strip 88 between two yellow fluorescent strips 86, 87. The width of the stripes of the pattern shapes 85, 86, 87, 88, 89 is preferably between ½ and 6 inches, more preferably between ⅝ and 4 inches, and most preferably between ⅞ and 2 inches. The width and the length of the base exterior extending between the perimeter of the base 81 and the external edges of the shape 87 are preferably between 1⁄16 and 6 inches, more preferably between ⅜ and 4 inches, and most preferably between ½ and 2 inches.

The internal shape 86, also rectangular, has a color which compliments the intermediate shape 88, creating a contrast along adjacent edges between the internal shape 86 and the intermediate shape 88. The internal shape 86, also has a color which compliments the base interior 82, creating a contrast along adjacent edges between the internal shape 86 and the base interior 82. The ancillary shapes 89, having various shapes which are also generally rectangular, have a color which compliments the base exterior 83, creating a contrast along adjacent edges between each of the ancillary shapes 89 and the base exterior 83. It is to be understood that variations in the alert pattern 80 are anticipated, a few of these, from other embodiments, are illustrated in FIGS. 11-14. Note that the pattern on the back of the panel 20 may be different from the pattern on the front of the panel 20, or the pattern may be repeated on each surface. Likewise, ancillary shapes 89 may be on both the front and back of the panel 20, may only be visible on one the front and back of the panel 20, or may not be visible on either the front and back of the panel 20.

It is to be understood that while the base and the design shapes are both illustrated as generally rectangular in nature, these shapes can also be circular, triangular, octagonal, hexagonal, polygonal arrows, ovals, or any other two- or three-dimensional shapes. The overall pattern 80 can be provided as shown having a nested series of similar shapes creating a type of bulls-eye, or a combination of different shapes, a series of similar shapes in a striped pattern, a series of similar shapes in a checkered pattern, or a series of similar shapes in any other pattern.

Figure 16:
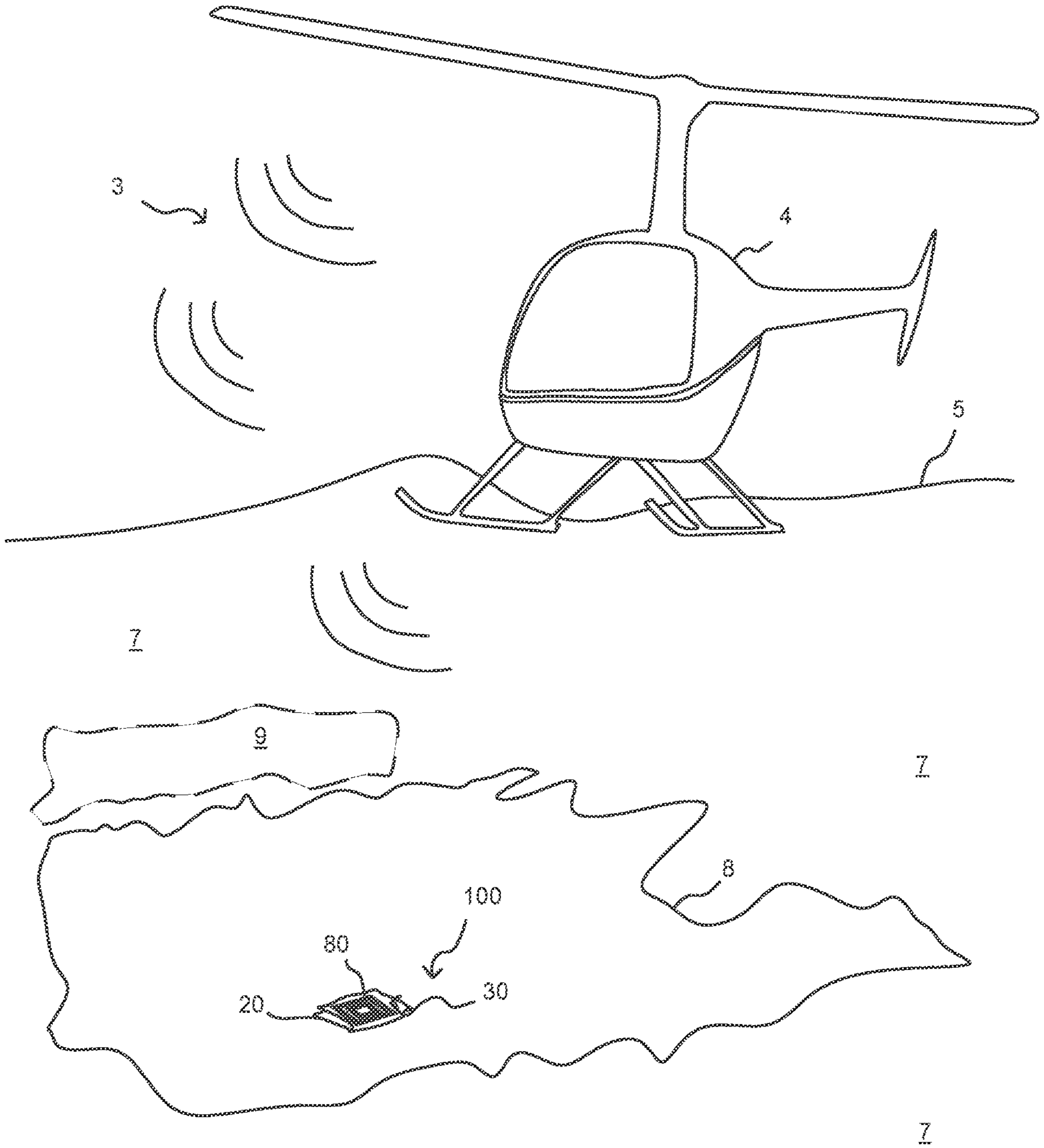
FIG. 16 is a perspective view of the embodiment of the invention shown in FIG. 13 as shown in use.

FIG. 15-16—Method of Use

In an emergency or any type of scenario where the use of arial platforms is required, a "long range target" and a "close range target" are required for the pilot to land exactly where they are needed rather than where he/she might think is the best location on the ground. The short-range target provided by the panel eliminates the time spent by the pilot in their search. A street intersection or a GPS grid are given for the long-range target which provides the pilot the direction of travel and an estimated area for where they are needed to search/land, however without the use of a short-range target, the pilot may not land in the best/most practical location for whoever is needing them on the ground. This is where the ultralight day/night marker comes into play, it gives the search and rescue pilot a definitive location of where to focus his/her attention.

After speaking with search and rescue professionals and being told that "approximately 30% of the time, lost/injured hikers are not found on the initial flyover" and reviewing the stats of lost/injured hikers in national parks, it is apparent that this small and lightweight marker would be of great importance and aid in a quick location of the individual who required assistance, saving valuable time which could mean the difference in life or death, while also saving money by reducing the amount of fuel consumed by the arial platforms involved in the search as well as man hours.

The marker has been tested rigorously using multiple sized helicopters to test the different wind speeds and how it will act when the rotor wash is hitting it from close distances. The goal was for the internal weights to keep the winds from getting under it and creating lift as long as possible and to collapse on itself, keeping it from catching flight, and the water/Gatorade/soda bottle placed inside the stuff sack underneath to keep the marker from leaving the ground altogether. The final tests with these designs were successful, and at no point was there any concern indicated from the helicopter pilot.

FIGS. 15 and 16 illustrate the use of two embodiments of the panel 20. As shown, the marker 20 was placed in a safe landing zone 8. Not only does this distinguish the difference between a dangerous landing zone 7 and a safe landing zone 8, but it also allows the avoidance of obstacles 9 which may not be fully visible or appreciated from aloft. As shown, the rotor wash 3 from the helicopter 4 acts upon the panel 20, with windspeeds which max up to 60 mph, or as otherwise stated, a dynamic load of at least 2 psf, but up to 10 psf, or up to 12 psf. However, the mooring assembly 30 acts to keep the marker system 100 from leaving the ground despite this dynamic load.

LIST OF REFERENCED ELEMENTS

The following reference numbers are adhered to within the specification to refer to those referenced elements within the drawings of the present application.

rotor wash 3
aircraft/helicopter 4
horizon 5
land 6
dangerous landing areas 7
safe landing zone 8
obstacles 9
panel 20
perimeter 21
top 22
corners 23
side 24
length 26
width 27
midpoints 28
bottom 29
mooring assembly 30
ballast assembly 40
compartment 42
hollow 43
ballast 44
seal 45
reversable inlet 46
anchor assembly 50
connector-d-ring 52
fastener 54
band 56
lanyard loops 57
spikes 58
large ballast assembly 60
compartment 62
hollow 63
removable ballast 64
seal 65
reversable inlet 66
tether 67
lock 70
first interlocking member 72
second interlocking member 74
indicator system 80
base 81
base interior 82
base exterior 83
base intermediate portion 84
shape 85
shape internal 86
shape external 87
intermediate shape 88
ancillary shapes 89
high visibility landing system 100

CONCLUSION

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A high visibility aerial landing system capable of employing environmental ballast; the high visibility aerial landing system comprising:

a marker panel backing having a front, a back, top, bottom, edges extending along a perimeter, with corners between adjacent edges;

a plurality of ballast assemblies secured to the marker panel, at least a first two of the plurality of ballast assemblies secured along edges of the marker panel;

an anchor assembly secured along corners of the marker panel;

an indicator system facilitating night vision; and wherein an additional of the plurality of ballast assemblies is a dual-capability ballast assembly comprising:

a compartment enclosing a hollow, a seal securing the compartment fixedly to the panel;

a reversible inlet along one lip of the compartment; and a locking mechanism along the reversible inlet capable of reversibly securing the hollow; and wherein the high visibility aerial landing system comprising a first configuration facilitating use;

wherein the high visibility aerial landing system comprising a second configuration facilitating travel;

wherein the hollow capable of containing the environmental ballast when the high visibility aerial landing system is in the first configuration; and wherein the hollow capable of containing the panel when the high visibility aerial landing system is in the second configuration.

2. The high visibility aerial landing system of claim 1, wherein the indicator system comprises a base of the panel, and at least one shape affixed to the base; wherein the base and the at least one shape having coordinated complementary colors, such that a color of the base has a first value H0, then a color of the at least one shape has a value according to the formula: $Hx=[H0-(360-x \text{ degrees})]+360$ degrees.

3. The high visibility aerial landing system of claim 1, wherein the indicator system further comprises:

a base of the panel being a reflective nylon;

a first strip of reflective webbing, having a first coloring, attached to the front of the reflective nylon;

a second strip of reflective webbing having a coloring the same as the first strip, attached to the front of the reflective nylon;

a third strip of reflective webbing having a coloring that is different from the first strip and the second strip, attached to the front of the reflective nylon panel backing between the first strip and the second strip; and at least four reflective lanyard loops, one of each attached to each of the at least four corners.

4. A high visibility aerial landing system comprising:

a marker panel backing having a top and bottom;

a mooring assembly secured to the panel, the mooring assembly having a plurality of ballast assemblies; and an indicator system facilitating scotopia; and wherein at least one of the plurality of ballast assemblies is a dual-capability ballast assembly;

wherein the mooring assembly secured to the panel further comprising an anchor assembly comprising a first irreversibly secured component being irreversibly secured to the panel and holding and further securing an reversibly attachable component; and wherein the first irreversibly secured component is a D-ring, and the reversibly attachable component is a reversible locking clamp.

5. The high visibility aerial landing system of claim 4, wherein the indicator system comprises a base of the panel, and at least one shape affixed to the base; wherein the base and the at least one shape having coordinated complementary colors, such that a color of the base has a first value H0, then a color of the at least one shape has a value according to the formula: Hx=[H0−(360−x degrees)]+360 degrees.

6. The high visibility aerial landing system of claim 4, wherein the indicator system comprises a base of the panel, and at least one shape affixed to the base; wherein the base and the at least one shape each consist of fluorescent reflective material of contrasting colors.

7. The high visibility aerial landing system of claim 4, wherein the indicator system comprises a base of the panel consisting of high visibility reflective nylon panel, and a high visibility aerial pattern having a shape with an internal shape, an external shape, and an intermediate shape, each nested one within the other.

8. The high visibility aerial landing system of claim 4, wherein each of the plurality of ballast assemblies of the mooring assembly secured to the panel further comprising an irreversibly secured component for holding and further securing at least one reversibly attachable weighted component.

9. The high visibility aerial landing system of claim 4, wherein each of the plurality of ballast assemblies of the mooring assembly secured to the panel further comprising a compartment enclosing a hollow; wherein the hollow capable of containing a ballast; and wherein each of the plurality of ballast assemblies further comprising a seal securing the compartment fixedly to the panel.

10. The high visibility aerial landing system of claim 9, wherein each of the plurality of ballast assemblies having a reversible inlet allowing additional ballast to be provided to the hollow; wherein the reversible inlet having a locking mechanism capable of reversibly securing the additional ballast.

11. The high visibility aerial landing system of claim 4, wherein the first irreversibly secured component is a nylon lanyard loop, and the reversibly attachable component is a grounding spike having a hook which interlocks with the nylon lanyard loop.

* * * * *